United States Patent [19]
Arslan et al.

[11] Patent Number: 6,108,517
[45] Date of Patent: Aug. 22, 2000

[54] METHODS AND APPARATUS FOR JOINT DEMODULATION OF ADJACENT CHANNEL SIGNALS IN DIGITAL COMMUNICATIONS SYSTEMS

[75] Inventors: Hüseyin Arslan; Someshwar C. Gupta, both of Dallas, Tex.; Gregory E. Bottomley; Sandeep Chennakeshu, both of Cary, N.C.

[73] Assignee: Ericsson Inc., Research Triangle Park, N.C.

[21] Appl. No.: 08/901,694

[22] Filed: Jul. 28, 1997

[51] Int. Cl.$^7$ ...................................................... H04B 7/10
[52] U.S. Cl. ............................... 455/21; 455/63; 455/37.1
[58] Field of Search ................................. 455/21, 17, 303, 455/24, 63, 37.1; 375/347, 349, 346, 348

[56] References Cited

U.S. PATENT DOCUMENTS

| | | | |
|---|---|---|---|
| 5,126,682 | 6/1992 | Weinberg et al. | 375/83 |
| 5,191,598 | 3/1993 | Bäckström et al. . | |
| 5,218,619 | 6/1993 | Dent | 375/1 |
| 5,506,861 | 4/1996 | Bottomley | 455/303 |
| 5,724,001 | 3/1998 | Chang | 375/325 |
| 5,790,606 | 8/1998 | Dent et al. | 375/348 |
| 5,822,380 | 10/1998 | Bottomley | 455/303 |
| 5,912,931 | 6/1999 | Matsumoto et al. | 375/340 |
| 5,937,015 | 8/1999 | Dent et al. | 375/341 |

FOREIGN PATENT DOCUMENTS

| | | |
|---|---|---|
| 637139 | 2/1995 | European Pat. Off. . |
| 725488 | 8/1996 | European Pat. Off. . |
| 762702 | 3/1997 | European Pat. Off. . |
| WO94/00918 | 1/1994 | WIPO . |
| WO96/04738 | 2/1996 | WIPO . |
| WO96/26578 | 8/1996 | WIPO . |

OTHER PUBLICATIONS

S. Golestaneh et al., "The Effect of Adjacent channel Interference on the Capacity of FDMA Cellular Systems," *IEEE Transactions on Vehicular Technology*, vol. 43, No. 4, Nov. 1994, pp. 946–954.

S. Sampei et al., "Rejection Method of Adjacent channel Interference for Digital Land Mobile Communications," *The Transactions of the IECE of Japan*, vol. E69, No. 5, May 1986, pp. 578–580.

B.R. Petersen, et al., "Suppression of Adjacent–Channel, Cochannel, and Intersymbol Interference by Equalizers and Linear Combiners," *IEEE Transactions on Communications*, vol. 42, No. 12, Dec. 1994, pp. 3109–3118.

V.K. Varma et al., "Performance of Partial Response CPM in the Presence of Adjacent Channel Interference and Gaussian Noise," *IEEE Transactions on Communications*, vol. COM–34, No. 11, Nov. 1986, pp. 1123–1131.

S.W. Wales, "Technique for Cochannel Interference Suppression in TDMA Mobile Radio Systems," *IEE Proc.–Commun*, vol. 142, No. 2, Apr. 1995, pp. 106–114.

(List continued on next page.)

*Primary Examiner*—David R. Hudspeth
*Assistant Examiner*—Daniel Abebe
*Attorney, Agent, or Firm*—Burns, Doane, Swecker & Mathis, L.L.P.

[57] ABSTRACT

Methods and apparatus for receiving adjacent channel signals wherein adjacent channel interference effects are minimized through joint demodulation of the adjacent channel signals. A channel associated with each signal and each corresponding frequency band is estimated and used to form joint branch metrics for joint sequence estimation. In an exemplary embodiment, a baseband processor receives baseband samples corresponding to at least one carrier frequency, and then jointly demodulates at least two information streams corresponding to different carrier frequencies in dependence upon the received baseband samples. In another embodiment, a joint channel estimator receives at least two baseband sample streams, each stream corresponding to a different frequency band, and jointly estimates medium responses for each of at least two information signals which were transmitted in different frequency bands.

17 Claims, 8 Drawing Sheets

OTHER PUBLICATIONS

P.A. Ranta, et al., "Co–Channel Interference Cancelling Receiver for TDMA Mobile Systems," *IEEE,* 1995, pp. 17–21.

G.D. Forney, Jr., "The Viterbi Algorithm," *Proceedings of the IEEE,* vol. 61, No. 3, Mar. 1973, pp. 268–278.

J. Wu et al., "A New Adaptive Equalizer with Channel Estimator for Mobile Radio Communications," *IEEE Transactions on Vehicular Technology,* vol. 45, No. 3, Aug. 1996, pp. 467–474.

G.E. Bottomley et al., "Adaptive MLSE Equalization Forms for Wireless Communications," *Fifth Virginia Tech Symposium on Wireless Communications,* Blacksburg, Va, May 31–Jun. 2, 1995, pertinent pages.

G. Ungerboeck, "Adaptive Maximum–Likelihood Receiver for Carrier–Modulated Data–Transmission Systems," *IEEE Transactions on Communications,* vol. COM–22, No. 5, May 1974, pp. 624–636.

G.E. Bottomley et al., "Adaptive Arrays and MLSE Equalization," *IEEE,* 1995, pp. 50–54.

European Standard Search Report re RS 99966 Date of completion of search: Jan. 27, 1998.

Giridhar, K. et al., "Joint Estimation Algorithms for Cochannel Signal Demodulations", Proceedings of the International Conference on Communications (ICC), Geneva, May 23–26, 1993, IEEE, vol. 3, pp. 1497–1501, (May 23, 1993).

Petersen, B. R. et al., "Suppression of Adjacent–channel, Cochannel, and Intersymbol Interference by Equalizers and Linear Combiners", IEEE Transactions on Communications, Dec. 1994, USA, vol. 42, No. 12, pp. 3109–3118 (Dec. 1994).

METHODS AND APPARATUS FOR JOINT DEMODULATION OF ADJACENT CHANNEL SIGNALS IN DIGITAL COMMUNICATIONS SYSTEMS

BACKGROUND

The present invention relates to digital communications and, in particular, to the demodulation of adjacent channel signals in digital communications systems.

A primary consideration in any digital communications system is the channel bandwidth required to transmit information. Generally, digital systems are designed to utilize channel bandwidth as efficiently as possible. For example, in systems utilizing frequency division multiplexing, maximum spectral efficiency is obtained by spacing frequency channels very close to one another in an available spectrum.

Figure 1:
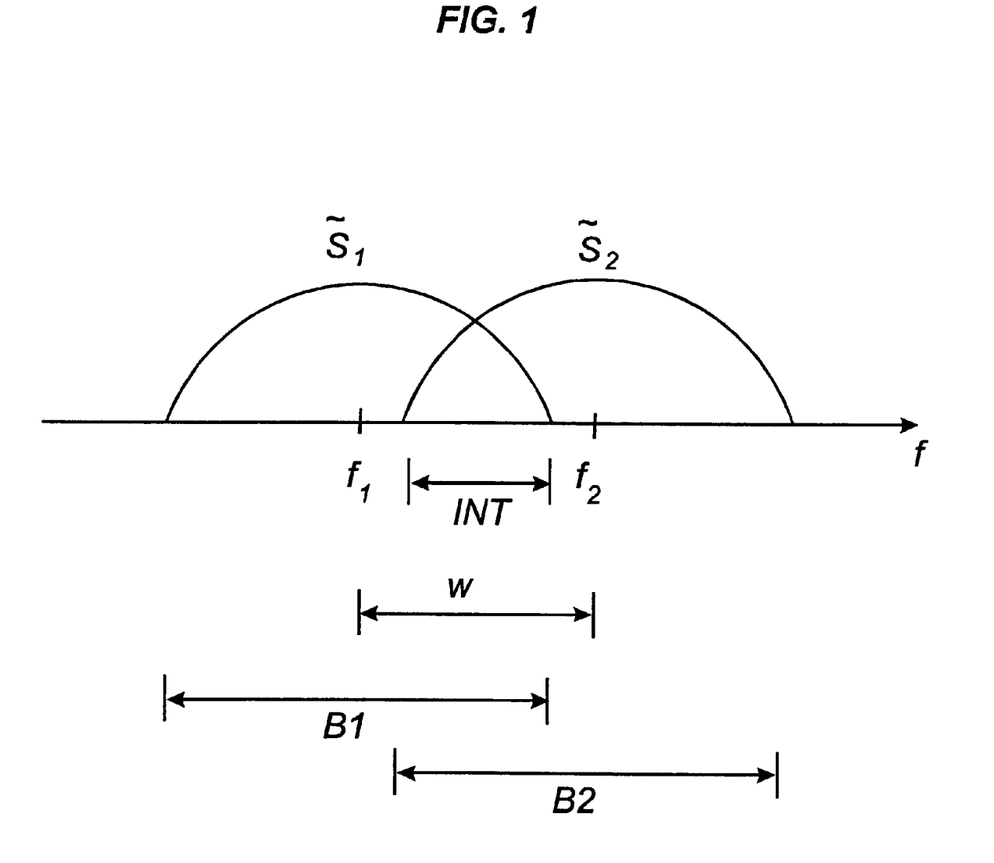
FIG. 1 depicts adjacent channel interference between signals modulated using two adjacent carrier frequencies.

Minimum carrier spacing is limited in practice, however, by adjacent channel interference. As shown in FIG. 1, adjacent channel interference is defined as the interference resulting when carrier frequencies are spaced close enough to one another that information signals modulated on the corresponding carriers overlap in the frequency spectrum. In FIG. 1, first and second modulated signals $\tilde{s}_1$, $\tilde{s}_2$ having first and second bandwidths B1, B2 are transmitted using first and second carrier frequencies $f_1$, $f_2$, respectively. The carrier, or channel, spacing between the first and second carrier frequencies $f_1$, $f_2$ is such that the first and second modulated signals $\tilde{s}_1$, $\tilde{s}_2$ overlap in a region of interference INT.

In practice, the minimum allowable carrier spacing is a function of the bandwidths of the information signals, the practical limitations associated with receiver filtering, and the signal modulation and coding schemes used. Any design improvement providing increased suppression of adjacent channel interference can be used advantageously to increase system capacity, relax coding and modulation design requirements, or improve signal quality.

In conventional systems, adjacent channel interference is suppressed in a number of ways. For example, in certain cellular radio systems, adjacent channel interference is avoided through channel allocation schemes in which channels immediately adjacent to one another in frequency are assigned to different spacial cells. Consequently, physical separation reduces mutual interference between adjacent channels. Such a system is described, for example, in *IEEE Transactions on Vehicular Technology*, Vol. 43, November 1994, S. Golestanch, "The effect of ACI on the capacity of FDMA cellular systems", which is incorporated herein by reference. In other communications systems (e.g., satellite and land mobile radio systems), however, suppression of adjacent channel interference by physical separation of adjacent channels may not be possible.

An alternative conventional approach is described in S. Sampei and M. Yokoyama, "Rejection Method of Adjacent Channel Interference for Digital Land Mobile Communications," *The Transactions of the IECE of Japan*, Vol. E 69, No. 5, pp. 578–580, May 1986, which is incorporated herein by reference. The cited method teaches that, during demodulation of a given carrier signal, a bandpass filter centered at an adjacent carrier is used to extract an adjacent channel signal (ACS) at the adjacent carrier. The extracted signal is then used to estimate the adjacent channel signal envelope and carrier and to coherently detect the adjacent channel signal. The detected adjacent channel signal is then waveform shaped, and the estimated adjacent channel carrier and envelope are impressed on the resulting signal. Ideally, the described process provides a reconstructed adjacent channel signal at its carrier frequency. The reconstructed signal can then be passed through a bandpass filter centered at the carrier of interest and subtracted from the received signal to remove the adjacent channel interference.

Such an approach has several limitations, however. For example, analog signal processing using filters and mixers adds undesirable cost and size to a radio receiver, and since the analog components vary with the manufacturing process, such receivers provide a relatively unpredictable range of performance. Additionally, subtracting a signal at radio frequency requires highly accurate carrier reconstruction and time alignment, as an error as small as half a cycle at radio frequency can cause the adjacent channel signal to double rather than diminish. Furthermore, such use of the adjacent channel carrier (phase and frequency) and envelope (amplitude) implicitly assumes that the radio channels are not dispersive. However, in many practical wireless systems (e.g., D-AMPS and GSM), the symbol rate is sufficiently high that the radio transmission medium must be modeled to include time dispersion which gives rise to signal echoes. Thus, the proposed technique is not always practical for use in many present day applications.

According to another conventional approach, demodulation parameters such as linear or decision feedback equalization filter coefficients are adapted to minimize noise and adjacent channel interference together. See, for example, *IEEE Transactions on Communications*, Vol. COM-42, December 1994, B. R. Petersen, "Suppression of Adjacent-Channel, Cochannel, and Intersymbol Interference by Equalizers and Linear Combiners". Alternatively, spectrally efficient continuous phase modulation (CPM) techniques can be used to reduce the effects of adjacent channel interference. See, for example, *IEEE Transactions on Communications*, Vol. COM-34, November 1986, V. K. Varma and S. C. Gupta, "Performance of partial response CPM in the presence of ACI and Gaussian noise".

As noted above, however, minimizing or avoiding adjacent channel interference using the above described systems provides only marginal improvement with respect to spectral efficiency, and current suppression mechanisms are inadequate for broad applications. Thus, there is a need for improved methods and apparatus for significantly reducing the impact of adjacent channel interference.

SUMMARY OF THE INVENTION

The present invention fulfills the above-described and other needs by providing a novel radio receiver structure. In an exemplary embodiment, a maximum likelihood sequence estimation receiver jointly estimates desired and adjacent channel parameters and jointly detects desired and adjacent bits. As a result, system performance with respect to adjacent channel interference and capacity is significantly improved as compared to prior art systems.

In an exemplary embodiment, a baseband processor receives a baseband signal including first and second signal components, wherein the first signal component corresponds to a first information signal transmitted in a first frequency band and the second signal component corresponds to a second information signal transmitted in a second frequency band. The exemplary baseband processor also includes a joint metric processor for computing a joint metric in dependence upon the received baseband signal. Advantageously, the joint metric provides information relating to the first and second information signals, and a sequence estimation processor within the baseband processor provides estimates of the first and second information signals based on the joint metric. As a result, accurate estimates of desired and adjacent signals can be efficiently and accurately obtained, and the effects of adjacent channel interference can be significantly reduced.

The above described and other features of the present invention are explained hereinafter with reference to the exemplary embodiments shown in the accompanying drawings. Those skilled in the art will appreciate that the embodiments are provided for purposes of illustration and that numerous variations are contemplated herein.

DETAILED DESCRIPTION OF THE INVENTION

Figure 2:
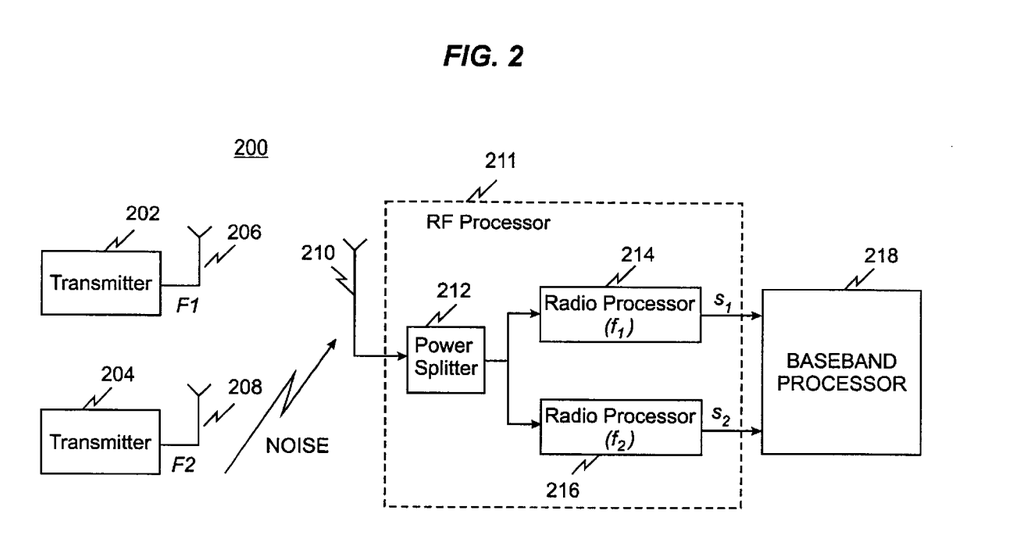
FIG. 2 depicts a radio communications system in which the teachings of the present invention can be utilized.

FIG. 2 depicts a radio communications system 200 in which the teachings of the present invention can be utilized. As shown, the radio system 200 includes a first radio transmitter 202 having a first transmit antenna 206, a second radio transmitter 204 having a second transmit antenna 208, and a radio receiver. The radio receiver includes a receive antenna 210, a radio frequency processor 211, and a baseband processor 218. The radio frequency processor 211 includes a power splitter 212, a first radio processor 214, and a second radio processor 216.

An output of the first radio transmitter 202 is coupled to the first transmit antenna 206 and an output of the second radio transmitter 204 is coupled to the second transmit antenna 208. The receive antenna 210 is coupled to an input of the power splitter 212 and an output of the power splitter 212 is coupled to inputs of the first and second radio processors 214, 216. Outputs of the first and second radio processors 214, 216 are coupled to inputs of the baseband processor 218.

In operation, the first transmitter 202 transmits a first information signal (modulated at a first carrier frequency $f_1$) from the first transmit antenna 206, and the second transmitter 204 transmits a second information signal (modulated at a second carrier frequency $f_2$) from the second transmit antenna 208. The transmitted signals reach the radio receiver after passing through a propagation medium (e.g., a mobile radio channel). Both of the transmitted signals, as well as noise, are received at the receiver antenna 210. The received signal is processed by the radio frequency processor 211 to produce a plurality of baseband signals corresponding to the different carrier frequencies $f_1$, $f_2$.

Specifically, the power splitter 212 splits the received signal and provides a copy to each of the radio processors 214, 216. The first radio processor 214 amplifies, mixes, filters, samples, and quantizes the signal to extract a first baseband signal $s_1$ corresponding to the first carrier frequency $f_1$ and the second radio processor 216 amplifies, mixes, filters, samples, and quantizes the signal to extract a second baseband signal $s_2$ corresponding to the second carrier frequency $f_2$. The resulting baseband signals $s_1$, $s_2$ are provided to the baseband processor 218 for demodulation of the transmitted information signals. While a specific radio frequency processor architecture is provided for purposes of illustration, those skilled in the art will appreciate that other known architectures can be used (e.g., wideband digitization followed by digital channelization). Additionally, a single transmitter can be used to transmit on both carrier frequencies $f_1$, $f_2$.

Figure 3:
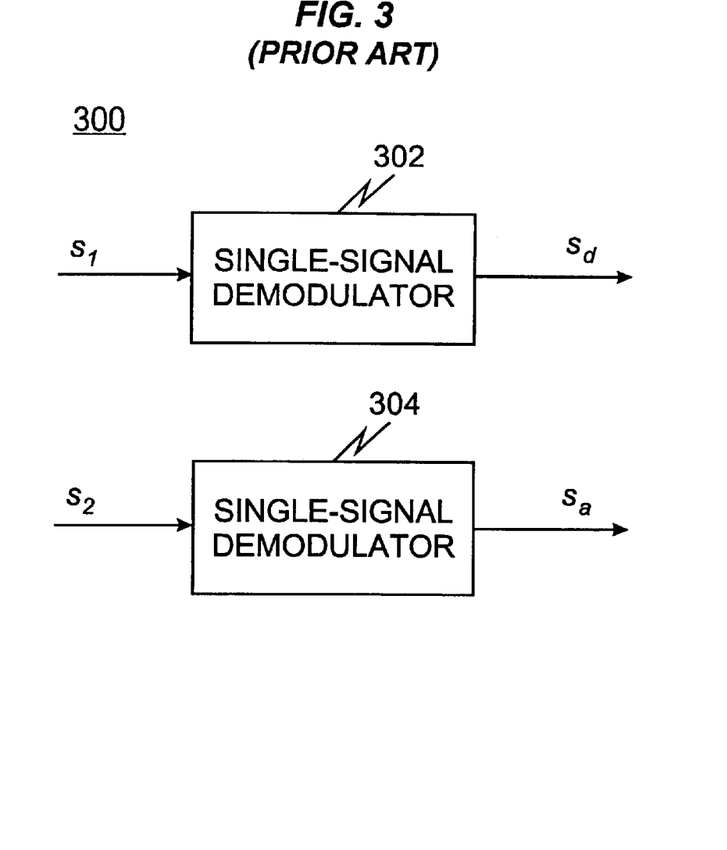
FIG. 3 depicts a conventional baseband processor.

FIG. 3 depicts a conventional two-channel demodulator 300 which can be included in the baseband processor 218 of FIG. 2. As shown, the two-channel demodulator 300 includes a first single-signal demodulator 302 and a second single-signal demodulator 304. The first received baseband signal $s_2$, corresponding to the first carrier frequency $f_1$, is coupled to an input of the first single-signal demodulator 302, and the first single-signal demodulator 302 provides a first detected signal $s_d$. The second received baseband signal $s_2$, corresponding to the second carrier frequency $f_2$, is coupled to an input of the second single-signal demodulator 304, and the second single-signal demodulator 304 provides a second detected signal $s_a$.

In operation, the first received baseband signal s, is processed by the first single-signal demodulator 302 using well known techniques to determine the channel parameters and information bits transmitted at the first carrier frequency $f_1$. Similarly, the second received baseband signal 52 is processed by the second single-signal demodulator 304 to determine the channel parameters and information bits transmitted at the second carrier frequency $f_2$. Significantly, demodulation of the two information signals is entirely decoupled, and the conventional demodulator is susceptible to adjacent channel interference effects as described above.

Figure 4:
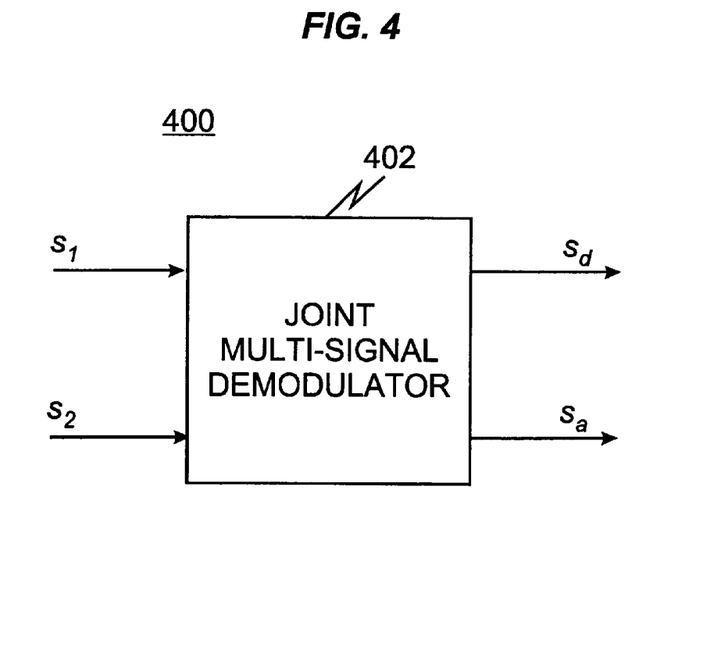
FIG. 4 depicts a baseband processor according to the present invention.

FIG. 4 depicts a two-channel demodulator 400 constructed in accordance with the present invention. As shown, the two-channel demodulator 400 includes a joint multi-signal demodulator 402 receiving first and second baseband signals $s_1$, $s_2$ as input and providing first and second detected signals $s_d$, $s_a$ as output. In operation, both baseband signals $s_1$, $s_2$ are used to jointly demodulate each transmitted information signal as described below. It should be noted here that the solution provided by the present invention (i.e., joint demodulation of information signals transmitted in adjacent frequency bands) is markedly different from conventional systems providing joint demodulation of co-channel information signals transmitted in a common band. Joint demodulation of co-channel signals using a single baseband signal is described for example in *IEEE Proceedings on Communications*, Vol. 142, No.2, April 1995, S. W. Wales, "Technique for co-channel interference suppression in TDMA mobile radio systems" and in *Proceedings of IEEE International Conference on Communications (ICC)*, 1995, P. A. Ranta, "Co-channel Interference Canceling Receiver for TDMA Mobile Systems". However, joint demodulation of co-channel signals is relatively easy to accomplish since co-channel signals occupy the same frequency band and therefore do not require symbol correction that depends upon the spacing between carriers. Additionally, only a single radio processor is employed in such systems. By way of contrast, the present invention is directed to methods and apparatus for jointly demodulating information signals transmitted in multiple frequency bands.

Figure 5:
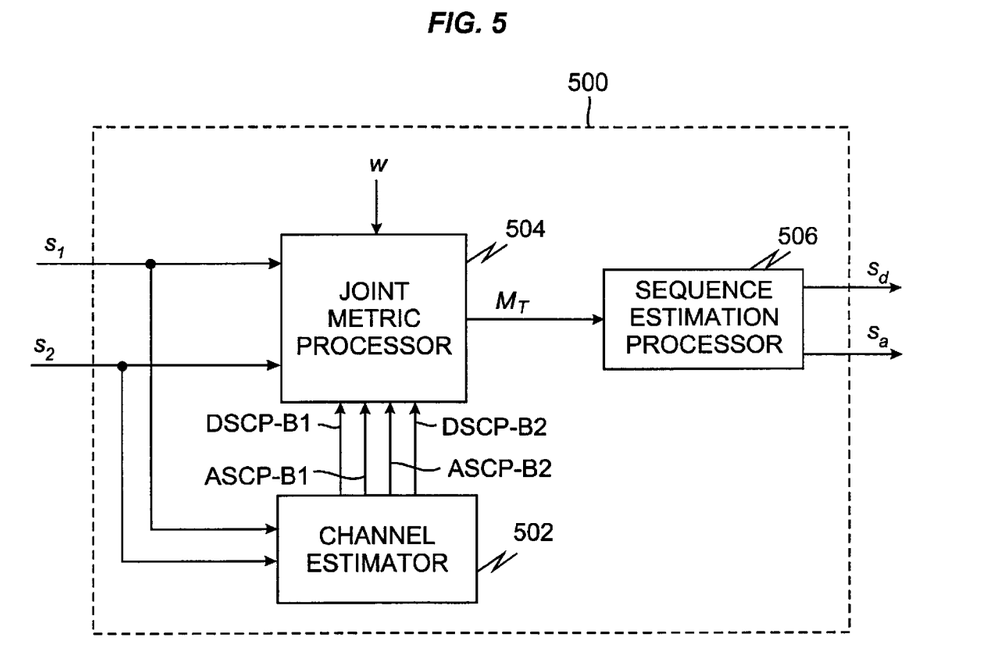
FIG. 5 depicts an exemplary embodiment of the baseband processor of FIG. 4.

FIG. 5 depicts an exemplary embodiment of a multi-signal demodulator constructed in accordance with the present invention. As shown, the two channel demodulator 500 includes a channel estimator 502, a joint metric processor 504, and a sequence estimation processor 506. The first received baseband signal $s_1$ is coupled to a first input of the joint metric processor 504 and to a first input of the channel estimator 502. The second received baseband signal $s_2$ is coupled to a second input of the joint metric processor 504 and to a second input of the channel estimator 502. The channel estimator 502 provides four channel parameter estimates DSCP-B1, ASCP-B1, DSCP-B2, ASCP-B2 which are coupled to four corresponding inputs of the joint metric processor 504. The four channel parameter estimates correspond to the desired signal response in the first band B1, the adjacent signal response in the first band B1, the desired signal response in the second band B2, and the adjacent signal response in the second band B2, respectively. 225

The carrier spacing ω is coupled to an additional input of the joint metric processor 504, and a joint metric $M_T$ provided by the joint metric processor 504 is coupled to an input of the sequence estimation processor 506. The sequence estimation processor 506 provides the first and second detected signals $s_d$, $s_a$ as output, where it is assumed for purposes of illustration that the information signal transmitted on the first carrier frequency $f_1$ is the desired signal and the information signal transmitted on the second carrier frequency $f_2$ is the adjacent signal (i.e., the interfering signal in the first band B1).

In operation, joint metrics are developed in the metric processor 504 as is described in more detail below. Advantageously, the joint metrics can incorporate multiple carriers as well as multiple antennas. The joint metrics utilize channel tap coefficient estimates for both desired (i.e., in-band) and interfering signals. The channel tap estimates are provided by the channel estimator 502. The resulting joint metric $M_T$ is provided to the sequence estimation processor 506, and the sequence estimation processor 506 provides estimates of the desired and adjacent information sequences $s_d$, $s_a$. Specifically, the sequence estimation processor 506 performs maximum likelihood sequence estimation (MLSE) based on the joint metric $M_T$.

Advantageously, the maximum likelihood sequence estimation provides an optimum detection algorithm in the presence of inter-symbol interference (ISI) and additive white Gaussian noise (AWGN). In the exemplary embodiment, the maximum likelihood sequence estimation is implemented in a re-cursive manner, for example using the Viterbi algorithm described in *Proceedings of the IEEE*, Vol. 61, March 1973, G. D. Forney, "The Viterbi Algorithm", which is incorporated herein by reference. Alternatively, the complexity of the maximum likelihood sequence estimation processor can be reduced by employing a suboptimum reduced-state Viterbi equalizer. Other known suboptimum equalization techniques can also be utilized. See, for example, *IEEE Transactions on Vehicular Technology*, Vol. 16, 45, August 1996, J. Wu and H. Aghvami, "A New Adaptive Equalizer with Channel Estimator for Mobile Radio Communications", which is incorporated herein by reference.

Further processing may follow the sequence estimation processor 506. For example, de-interleaving, decoding and conversion to speech typically follow sequence estimation in digital cellular systems. In this case, the sequence estimation processor 506 may also provide soft information relating to the reliability or likelihood of true bit values. When coding and interleaving is across frequency bands, joint decoding using both outputs of 506 can be used.

For the channel estimation process carried out by the channel estimator 502, data sequences can be inserted periodically into the transmitted information sequences at the transmitters 202, 204. Such data sequences, commonly called synchronizing sequences, are known at the receiver, and different sequences are used for the desired signal and each adjacent signal. The channel estimation, therefore, can be carried out using the synchronizing sequences and other known parameters. Generally, least square estimation (the most common and efficient method in the presence of additive white Gaussian noise) can be used to estimate the channel parameters. A novel joint channel estimation scheme is described in detail below.

It is assumed in the description that channel estimates obtained during transmission of the synchronizing sequences are held constant during subsequent transmission of information sequences (until transmission of the next synchronizing sequences). It is possible, however, to adapt the channel estimates using known adaptive channel estimation methods. See, for example, G. E. Bottomley and S. Chennakeshu, "Adaptive MLSE equalization forms for wireless communications", Virginia Tech's Fifth Symposium on Wireless Personal Communications, May 31–Jun. 2 1995, which is incorporated herein by reference. Furthermore, if synchronizing sequences are not provided, known blind channel estimation techniques may be employed. Those skilled in the art will appreciate that the following joint channel estimation scheme is but one scheme which can be used in the joint demodulation approach taught by the present invention.

To provide the channel estimates, certain features of the transmitters 202, 204 and the radio processors 214, 216 are modeled. For example, information symbols are typically passed through pulse shaping filters prior to transmission. The pulse shapes are often selected such that the transmitted signal will have a compact power spectrum, and the pulses typically extend more than one symbol interval (i.e., partial response pulse shaping). In the radio processors 214, 216, receiver filters are typically selected such that they collect signal energy. If the radio channel, or medium, is modeled as another filter, then a received baseband signal can be expressed generally as a convolution of the information symbols which are transmitted in the corresponding frequency band with the overall effects of the transmitter pulse shapes tx, the medium response g, and the receiver filters rx as follows:

$$\text{received signal} = \text{transmitted symbols} \otimes (tx \otimes g \otimes rx) \quad (1)$$

where ⊗ indicates the convolution operation. As noted above, the synchronization symbols, the transmit pulse shapes, and the receiver filters are known at the receiver. However, the medium response g changes with the environment and is therefore estimated dynamically so that the information symbols can be estimated more accurately. Thus, equation (1) can be more conveniently written such that the known terms are grouped together and the unknown term g is separated as follows:

$$\text{received signal} = [\text{transmitted symbols} \otimes (tx \otimes rx)] \otimes g \quad (2)$$

To facilitate explanation of the invention, the baseband-symbol-spaced samples resulting from the convolution of the transmit pulse shapes tx and the receiver filters rx are designated hereinafter as the R parameters, and the samples resulting from the convolution of the R parameters with the synchronizing symbols in the baseband are designated hereinafter as the X parameters. Note that all of the parameters are obtained in the baseband since the signals $s_1$, $s_2$ provided as input to the multi-signal demodulator 500 are baseband signals. As a result, rotations based on the carrier spacing $\omega$ (which is known or estimated at the receiver) are used in obtaining local replicas of the desired and adjacent signals and the corresponding parameters. Such rotation is described in more detail below.

Figure 6:
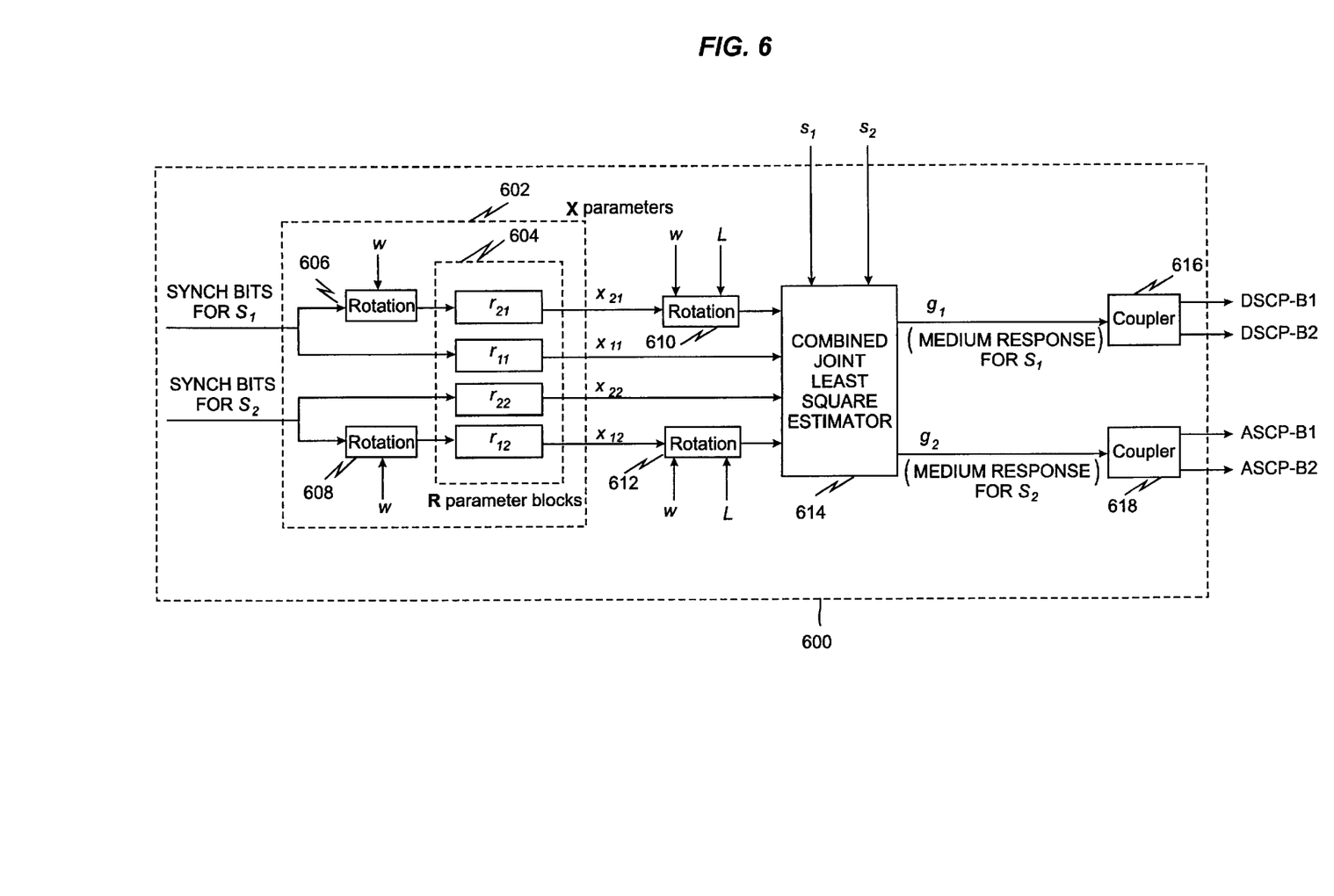
FIG. 6 depicts an exemplary joint channel estimator according to the present invention.

FIG. 6 depicts an exemplary embodiment of a joint channel estimator 600 which can be used to implement the channel estimator 502 of FIG. 5. As shown, the joint channel estimator 600 includes an X-parameter processor 602 having first and second rotation devices 606, 608 and four R-parameter devices $r_{21}$, $r_{11}$, $r_{22}$, $r_{12}$. The joint channel estimator 600 also includes third and fourth rotation devices 610, 612, a combined joint least square estimator 614, and first and second couplers 616, 618. Synchronization bits for the first baseband signal $s_1$ are provided to an input of the first rotation device 606 and to the second R-parameter device $r_{11}$. Synchronization bits for the second baseband signal $s_2$ are provided to the third R-parameter device $r_{22}$ and to an input of the second rotation device 608.

The carrier spacing X is provided to a second input of the first rotation device 606, and an output of the first rotation device 606 is coupled to an input of the first R-parameter device $r_{21}$. The carrier spacing X is also provided to a second input of the second rotation device 608, and an output of the second rotation device 608 is coupled to an input of the fourth R-parameter device $r_{12}$. A first X-parameter $x_{21}$ output by the first R-parameter device $r_{21}$ is coupled to an input of the third rotation device 610, and a fourth X-parameter $x_{12}$ output by the fourth R-parameter device $r_{12}$ is coupled to an input of the fourth rotation device 612. Second and third X-parameters $x_{11}$, $x_{22}$, output by the second and third R-parameter devices $r_{11}$, $r_{22}$, respectively, are coupled to inputs of the combined joint least square estimator 614.

The carrier spacing X and a tap count L (corresponding to the number of channel coefficients, or taps, used to model the medium responses) are coupled to inputs of the third rotation device 610. An output of the third rotation device 610 is coupled to an input of the combined joint least square estimator 614. The carrier spacing $\omega$ and the tap count L are also provided as inputs to the fourth rotation device 612. An output of the fourth rotation device 612 is coupled to an input of the combined joint least square estimator 614. The combined joint least square estimator 614 receives the first and second baseband signals $s_1$, $s_2$ and provides estimates $g_1$, $g_2$ of the first and second medium responses (corresponding to the first and second transmitted signals, respectively). The first medium response estimate $g_1$ is coupled to the first coupler 616 which produces two channel parameter estimates DSCP-B1, DSCP-B2 for the desired signal $s_d$. The second medium response estimate $g_2$ is coupled to the second coupler 618 which produces two channel parameter estimates ASCP-B1, ASCP-B2 for the adjacent signal $s_a$.

In operation, the X parameters are obtained locally at the receiver (in unit 602) using the prior knowledge of the synchronization bits for both signals, the transmit pulse shapes, the receiver filter characteristics, and the carrier spacing $\omega$. Therefore, the X parameters represent the locally generated signals in each band, less the effects of the medium responses. In other words, the medium responses are initially assumed to be delta functions having amplitude one, $\delta(t)$. Since fixed and known filters are typically used in the receiver (a common practice, for example, in the wireless communications industry), and since the other components of the X parameters are also known and fixed, the X parameters can be computed once and stored in a memory location at the receiver. Thus, the X parameters need not be calculated in real time, and the complexity of the receiver structure can be reduced. Should the receive filter responses be unknown, however, they can be estimated periodically and the estimates used to periodically update the R parameters and the X parameters.

As shown in FIG. 6, the (locally known) synchronization bits corresponding to both baseband signals $s_1$, $s_2$ are split to provide two copies of each. One copy of the synchronization bits for the first baseband signal $s_1$ is rotated by the carrier spacing X in the first rotation unit 606. Also, one copy of the synchronization bits for the second information signal $s_2$ is rotated by the carrier spacing $\omega$ in the second rotation unit 608. The four resulting copies of the synchronization bits are then passed through the R parameter devices (within R-parameter unit 604) to generate the four X parameters $x_{21}$, $x_{11}$, $x_{22}$, $x_{12}$. Those skilled in the art will appreciate that the sampling rate can be symbol spaced or fractionally spaced.

Note that the first X parameter $x_{21}$ represents a locally generated version of the first baseband signal as received, shifted, filtered, and sampled in the second band B2, without the effect of the corresponding medium response $g_1$. Similarly, the second X parameter $x_{11}$ represents a locally generated version of the first baseband signal as received, filtered, and sampled in the first band B1, without the effect of the corresponding medium response $g_1$. The third X parameter $x_{22}$ represents a locally generated version of the second baseband signal as received, shifted, filtered, and sampled in the second band B2, without the effect of the corresponding medium response $g_2$. Finally, the fourth X parameter $x_{12}$ represents a locally generated version of the second baseband signal as received, filtered, and sampled in the first band B1, without the effect of the corresponding medium response $g_2$.

As shown, the third and fourth rotation devices 610, 612 are used to rotate the first and fourth X parameters $x_{21}$, $x_{12}$ in dependence upon the carrier spacing $\omega$ and the number of medium tap counts L. The combined joint least square estimator 614 then estimates the first and second medium impulse responses $g_1$, $g_2$ for the first and second signal transmission paths using the following equations:

$$\hat{s}_1(n) = \sum_{l=0}^{L-1} g_1(l) x_{11}(n-l) + \sum_{l=0}^{L-1} g_2(l) x_{12}(n-l) e^{j\omega lT} \quad (3)$$

$$\hat{s}_2(n) = \sum_{l=0}^{L-1} g_1(l) x_{21}(n-l) e^{-j\omega lT} + \sum_{l=0}^{L-1} g_2(l) x_{22}(n-l) \quad (4)$$

where $\hat{s}_1$ and $\hat{s}_2$ represent the locally generated (estimated) signals in the first and second frequency bands B1, B2, respectively, $g_1$ and $g_2$ represent the sample-spaced medium responses corresponding to the first and second signal transmission paths, respectively, L represents the number of taps used to model the medium responses, n is the sample period index, and T is the sample period. Though the number of taps L is shown as equal for both medium responses in equations (3) and (4), it will be appreciated that the number of taps need not be the same for both medium responses.

Advantageously, the least square estimator 614 obtains the medium responses jointly by minimizing the squared difference between the first and second received signals $s_1(n)$, $s_2(n)$ and the first and second modeled signals $\hat{s}_1(n)$, $\hat{s}_2(n)$. A combined least squares cost function can be obtained using a weighted sum of the resulting squared differences. Once the medium response taps are estimated, the first and second medium responses $g_1$, $g_2$ are coupled with the R parameters in the first and second couplers 616, 618, respectively, to obtain overall channel tap estimates for each signal in both frequency bands B1, B2.

Figure 7:
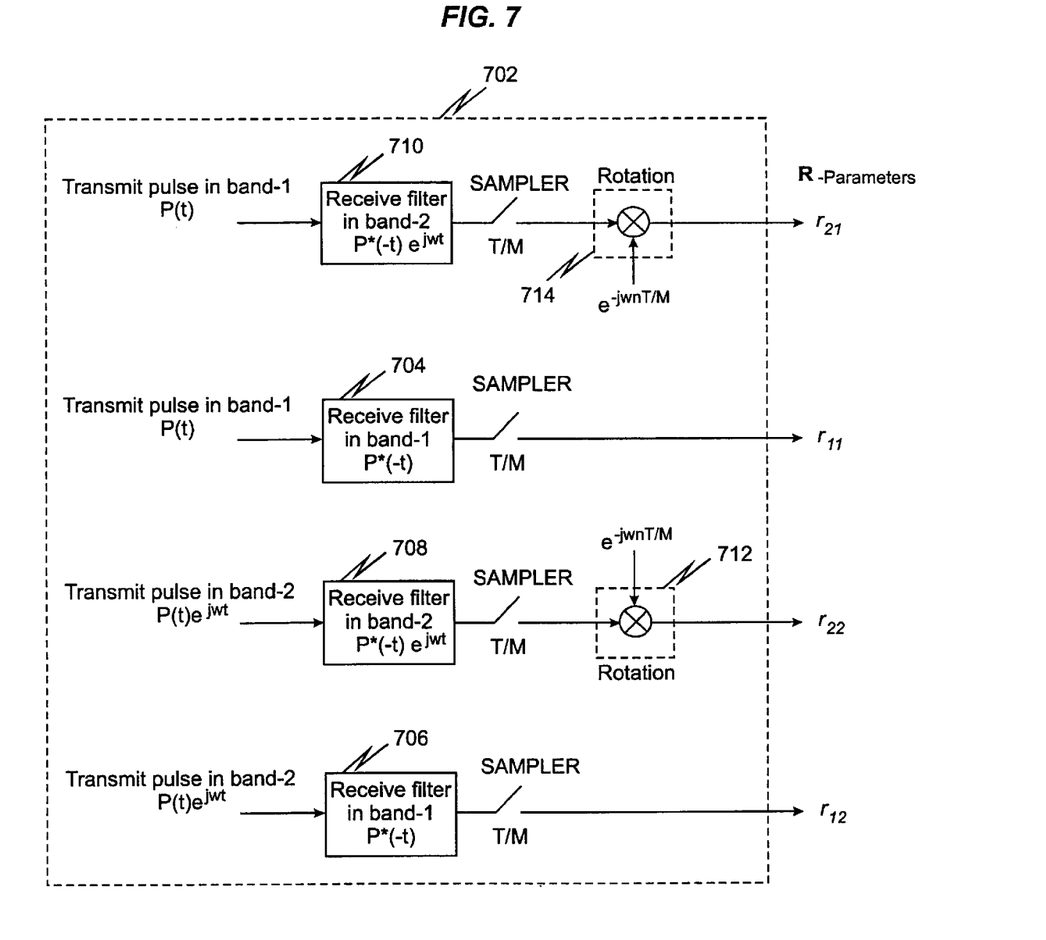
FIG. 7 depicts exemplary generation of R-parameters used in the joint channel estimator of FIG. 6.

FIG. 7 depicts an exemplary R-parameter processor 702 which can be used to provide the four R parameters $r_{21}$, $r_{11}$, $r_{22}$, $r_{12}$ in the embodiment of FIG. 6. As shown, the R-parameter processor 702 includes a first band-2 receive filter 710, a first band-1 receive filter 704, a second band-2 receive filter 708, a second band-1 receive filter 706, and first and second rotation devices 714, 712 (wherein band-1 and band-2 indicate the first and second frequency bands B1, B2, respectively). The first band-2 receive filter 710 receives a band-1 transmit pulse P(t) (corresponding to the transmit pulse shape used in the first transmitter) and, in response, generates an output which is coupled to the first rotation device 714 via a sampler. An output of the first rotation device 714 represents the first R parameter $r_{21}$.

The first band-1 receive filter 704 also receives the band-1 transmit pulse P(t), and a sampled output of the first band-1 receive filter 704 represents the second R parameter $r_{11}$. The second band-2 receive filter 708 receives a band-2 transmit pulse $P(t)e^{iwt}$ (corresponding to the transmit pulse shape used in the second transmitter) and, in response, generates an output which is coupled to the second rotation device 712 via a sampler. An output of the second rotation device 712 represents the third R parameter $r_{22}$. The second band-1 receive filter 706 also receives the band-2 transmit pulse $P(t)e^{iwt}$, and a sampled output of the second band-1 receive filter 706 represents the fourth R parameter $r_{12}$.

Thus, the first R parameter $r_{21}$ is obtained by passing (and then sampling) the transmitted pulse shape in the first band B1 through the first band-2 receive filter 710 and rotating the resulting samples by the carrier spacing c at the first rotation device 714. The second R parameter $r_{11}$ is obtained by passing (and then sampling) the transmitted pulse shape in the first band B1 through the first band-1 receive filter 704. Similarly, the third R parameter $r_{22}$ is obtained by passing (and then sampling) the transmitted pulse shape in the second band B2 through the second band-2 receive filter 708 and rotating the samples by the carrier spacing $\omega$ at the second rotation device 712. The fourth R parameter $r_{12}$ is obtained by passing (and then sampling) the transmitted pulse shape in the second band B2 through the second band-1 receive filter 706.

Although the joint channel estimation scheme is described with respect to the joint multi-signal demodulation scheme taught by the present invention, those skilled in the art will appreciate that the joint channel estimation scheme can also be utilized to implement other multi-signal and single-signal demodulation techniques. Also note that for systems employing multiple receive antenna, the joint channel estimation approach can be duplicated for each antenna or antenna element.

Figure 8:
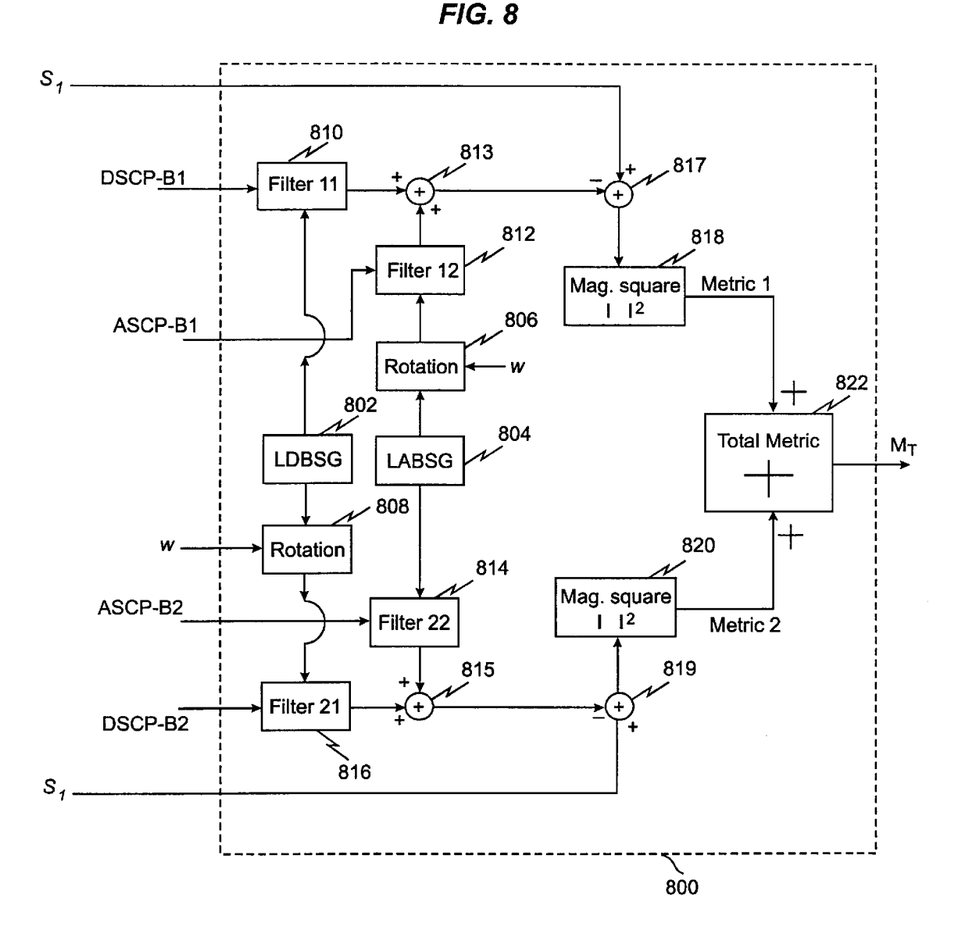
FIG. 8 depicts an exemplary metric processor according to the present invention.

FIG. 8 depicts an exemplary metric processor 800 which can be used to implement the joint metric processor 504 of FIG. 5. As shown, the metric processor 800 includes a local desired bit sequence generator 802, a local adjacent bit sequence generator 804, first and second rotation devices 806, 808, four filters 810, 812, 814, 816, first and second magnitude square devices 818, 820, and five summing devices 813, 815, 817, 819, 822. The first and second baseband signals $s_1$, $s_2$ are coupled to positive inputs of the third and fourth summing devices 817, 819, respectively. The first channel parameter estimate DSCP-B1 (for the desired signal in the first band B1) is coupled to an input of the first filter 810, and the second channel parameter estimate ASCP-B1 (for the adjacent signal in the first band B1) is coupled to an input of the second filter 812. The third channel parameter estimate ASCP-B2 (for the adjacent signal in the second band B2) is coupled to an input of the third filter 814, and the fourth channel parameter estimate DSCP-B2 (for the desired signal in the second band B2) is coupled to an input of the fourth filter 816.

Output of the local desired bit sequence generator 802 is coupled to a second input of the first filter 810 and to a first input of the second rotation device 808. An output of the local adjacent bit sequence generator 804 is coupled to a first input of the first rotation device 806 and to a second input of the third filter 814. The carrier spacing $\omega$ is coupled to a second input of each of the rotation devices 806, 808, and outputs of the first and second rotation devices 806, 808 are coupled to second inputs of the second and fourth filters 812, 816, respectively. Outputs of the first and second filters 810, 812 are coupled to positive inputs of the first summing device 813, and an output of the first summing device 813 is coupled to a negative input of the third summing device 817. Outputs of the third and fourth filters 814, 816 are coupled to positive inputs of the second summing device 815, and an output of the second summing device 815 is coupled to a negative input of the fourth summing device 819. Outputs of the third and fourth summing devices 817, 819 are coupled to inputs of the magnitude squared devices 818, 820, respectively, and outputs of the first and second magnitude squared devices 818, 820 are coupled to positive inputs of the fifth summing device 822. Output of the fifth summing device 822 represents the total joint metric $M_T$.

In operation, hypothetical desired and adjacent bits are generated at the local desired bit sequence generator 802 and the local adjacent bit sequence generator 804, respectively. To generate an estimate of the first information signal as received in the first frequency band B1 (corresponding to the first carrier frequency $f_1$), a rotation is applied to the adjacent bits according to the channel spacing $\omega$ in the first rotation unit 806. In the first frequency band B1, the radio processor 214 is adjusted to receive the desired signal. However, because of close channel spacing, adjacent signal components can also appear in the first band B1, creating an interference effect with respect to the desired signal.

The generated desired bits and rotated adjacent bits are passed through the first and second filters 810, 812, respectively. Parameters for the first and second filters 810, 812 (i.e., the desired signal channel parameters for band-1 DSCP-B1 and the adjacent signal channel parameters for band-1 ASCP-B1), are obtained for example via the joint channel estimation unit 600 as described above. The first and second filters 810, 812 thus simulate the effect of the desired and adjacent channels in the first band B1. The outputs of the first and second filters 810, 812 are added in the first adder 813 to obtain an estimated version of the first transmitted signal, and the estimated version is subtracted (in the third summing device 817) from the actual received signal in the first band B1. The magnitude square of the difference is then computed in the first magnitude square device 818 to obtain a first branch metric (Metric 1).

To generate an estimate of the second signal in the second frequency band B2 (corresponding to the second carrier frequency $f_2$), a rotation is applied to the desired bits according to the channel spacing $\omega$ in the second rotation device 808. In the second band B2, the radio processor 216 is adjusted to receive the adjacent signal. However, because of close channel spacing, desired signal components can also appear in the second band B2, creating an interference effect with respect to the adjacent signal.

The generated adjacent bits and rotated desired bits are passed through the third and fourth filters 814, 816, respectively. Parameters of the third and fourth filters 814, 816 (i.e., the adjacent signal channel parameters for band-2 ASCP-B2 and the desired signal channel parameters for band-2 DSCP-B2) are obtained for example via the joint channel estimation unit 600. The third and fourth filters 814, 816 thus simulate the effect of the adjacent and desired channels in the second band B2. The outputs of the third and fourth filters 814, 816 are added in the second summing device 815 to obtain an estimated version of the second transmitted signal, and the estimated version is subtracted (in the fourth summing device 819) from the actual received signal in the second band B2. The magnitude square of the difference is then calculated in the second magnitude square device 820 to obtain a second branch metric (Metric 2).

The first and second branch metrics (Metric 1 and Metric 2) are added in the fifth summing device 822 to obtain the total branch metric $M_T$. The branch metrics can be weighted prior to adding, for example to account for differences in noise levels. In systems employing multiple antennas, metrics from additional antennas can be weighted and combined. The total branch metric $M_T$ is provided to the sequence estimation processor 506 as described above. Those skilled in the art will appreciate that many other metric variations are possible. For example, a "partial Ungerboeck" form can be used, as described in the paper by G. E. Bottomley and S. Chennakeshu incorporated by reference above. Also, a Euclidean distance metric can be used.

Though the embodiments have been described with respect to two information signals and two baseband signals, those skilled in the art will appreciate that the invention is applicable for any number of information signals and carrier frequencies. Note, for example, that two adjacent signals can be jointly demodulated using only one baseband signal, corresponding to only one of the two carriers. Also, the present invention can be applied to demodulate both co-channel and adjacent channel signals.

An alternate multi-signal demodulator according to the present invention can be constructed by extending the modified metric described by G. Ungerboeck in *IEEE Transactions on Communications*, vol. COM-22, May 1974, "Adaptive Maximum-Likelihood Receiver for Carrier-Modulated Data-Transmission Systems", which is incorporated herein by reference. In accordance with the present invention, this alternate demodulator utilizes receiver filters that are matched to the overall channel responses (reflecting the effect of both the transmit pulse shapes and the medium responses). For example, receiver filters that are matched to the (fixed) transmit pulse shapes can be used in combination with second-stage filters which are based on the estimated medium responses for optimum detection.

Figure 9:
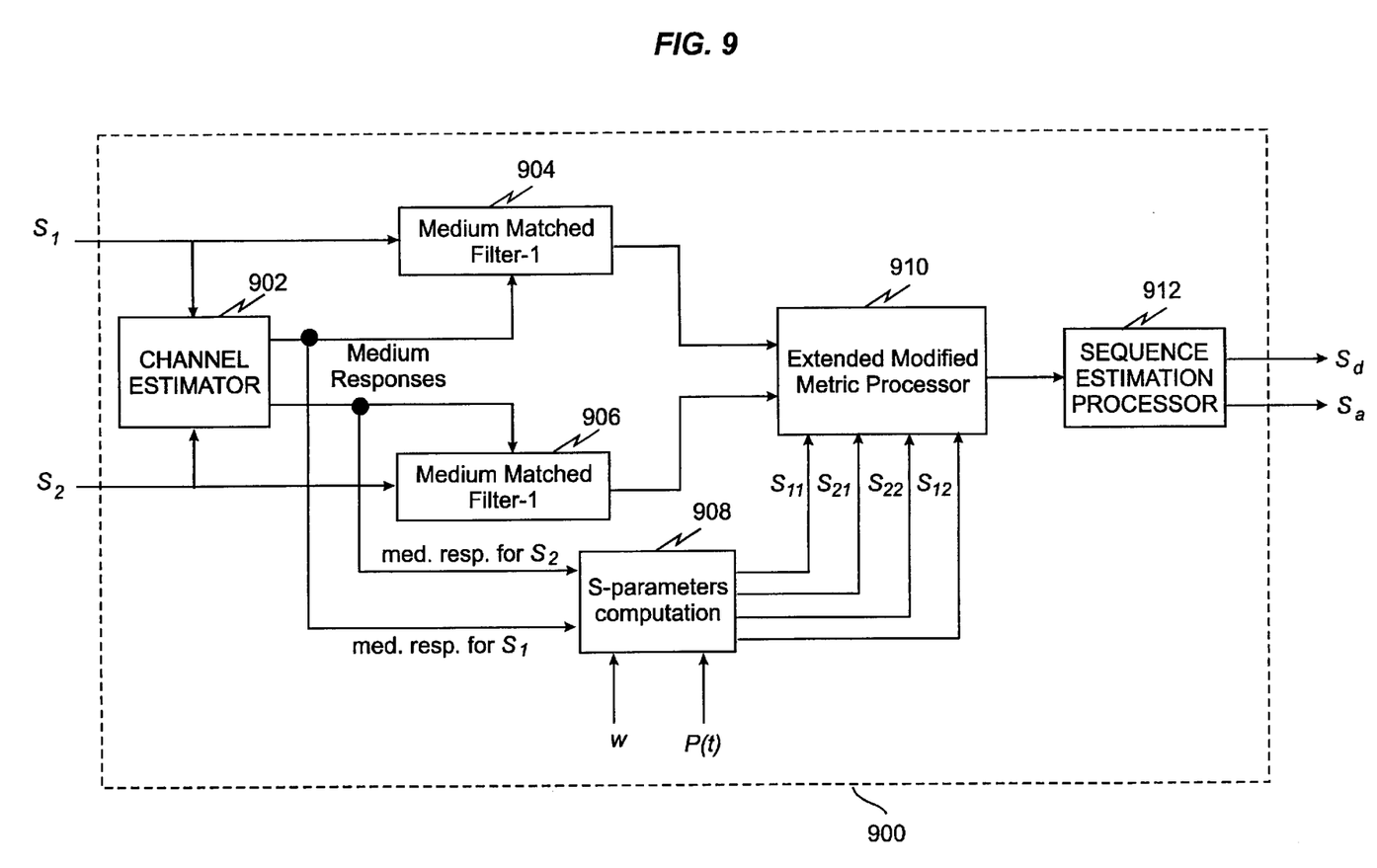
FIG. 9 depicts an alternative embodiment of the baseband processor of FIG. 4.

FIG. 9 depicts such an alternate two channel demodulator 900. As shown, the two channel demodulator 900 includes a channel estimator 902, first and second medium matched filters 904, 906, an S-parameter computation device 908, an extended modified metric processor 910, and a sequence estimation processor 912. The first baseband signal $s_1$ is coupled to an input of the first medium matched filter 904 and to a first input of the channel estimator 902. The second baseband signal $s_2$ is coupled to an input of the second medium matched filter 906 and to a second input of the channel estimator 902. A first output of the channel estimator 902 is coupled to a second input of the first medium matched filter 904, and to a second input of the S-parameter computation device 908. A second output of the channel estimator 902 is coupled to a second input of the second medium matched filter 906 and to a first input of the S-parameter computation device 908.

Outputs of the first and second medium matched filters 904, 906 are coupled to first and second inputs of the extended modified metric processor 910. The carrier spacing $\omega$ and the transmit pulse P(t) are coupled to third and fourth inputs of the S-parameter computation device 908, and four S parameters $s_{11}$, $s_{21}$, $s_{22}$, $s_{12}$ output by the S-parameter computation device 908 are coupled to additional inputs of the extended modified metric processor 910. An output of the extended modified metric processor 910 is coupled to an input of the sequence estimation processor 912, and first and second outputs of the sequence estimation processor 912 represent the first and second detected signals $s_d$, $s_n$.

In operation, the first and second medium responses $g_1$, $g_2$ are obtained via the channel estimation unit as described above. The medium response parameters are then used to set time-varying medium matched filters for optimum demodulation. The four S parameters $s_{11}$, $s_{21}$, $s_{22}$, $s_{12}$, which represent the overall effect of the transmitter filters, the medium responses, the receiver filters, and the medium matched filters in both bands B1, B2, are obtained using the prior knowledge of the transmit pulse shapes, the carrier spacing a, and the estimated medium responses.

The first S parameter $s_{11}$ represents the overall effect of the transmitter filter in the first band B1, the medium response for the first transmitted signal, the receiver filter in the first band B1, and the first medium matched filter. The second S parameter $s_{21}$ represents the overall effect of the transmitter filter in the second band B2, the rotated medium response for the second signal, the receiver filter in the first band B1, and the first medium matched filter. The third S parameter $s_{22}$ represents the overall effect of the transmitter filter in the second band B2, the medium response for the second transmitted signal, the receiver filter in the second band B2, and the second medium matched filter. The fourth S parameter $S_{12}$ represents the overall effect of the transmitter filter in the first band B1, the rotated medium response for the first signal, the receiver filter in the second band B2, and the second medium matched filter.

The outputs of the medium matched filters and the S parameters are used to compute extended modified branch metrics $M_1$, $M_2$ in the modified metric processor 910 according to the following equations:

$$M_1 = Re\left\{d_n^*\left(2z_1(n) - d_n s_{11}(0) - 2\sum_{u=1}^{L} d_{n-u} s_{11}(u) - \hat{a}_n s_{21}(0) - 2\sum_{u=1}^{K} \hat{a}_{n-u} s_{21}(u)\right)\right\} \quad (5)$$

$$M_2 = Re\left\{a_n^*\left(2z_2(n) - a_n s_{22}(0) - 2\sum_{u=1}^{L} a_{n-u} s_{22}(u) - \hat{d}_n s_{22}(0) - 2\sum_{u=1}^{K} \hat{d}_{n-u} s_{12}(u)\right)\right\} \quad (6)$$

where $z_1$ and $z_2$ are the outputs of the medium matched filters, $d_n$ and $a_n$ are the locally generated desired and adjacent bits, "*" indicates the conjugation operation, $\hat{d}_n$ and $\hat{a}_n$ are the rotated versions of the locally generated desired and adjacent bits, Re{x} represents the real part of {x}, and n is the symbol period index. The total metric $M_T$ is obtained by summing the branch metrics $M_1$, $M_2$. The total metric is provided to the sequence estimation processor 912 for estimation of the desired and adjacent information bits.

Those having ordinary skill in the art will appreciate that the present invention is applicable when diversity or phased antenna arrays are employed at the receiver. In such systems, a plurality of received signals, corresponding to different antennas or beams, are provided. Differences between what is received and what is expected on each antenna can be used to form branch metrics in a common sequence estimation process. Antenna signals can be combined, for example, by forming metrics (magnitude squares) for each antenna and summing the metrics to form a combined branch metric. See, for example, Backstrom et al, U.S. Pat. No. 5,191,598, issued Mar. 2, 1993, which is incorporated herein by reference. Other antenna combining approaches can also be used. See, for example, G. E. Bottomley and K. Jamal, "Adaptive arrays and MLSE equalization," *Prococeedings of the 45th IEEE Vehicular Technology Conference* (VTC '95), Chicago, Jul. 25–28, 1995, which is incorporated herein by reference.

Though the invention has been illustrated with respect to a hybrid FDMA/TDMA system, those skilled in the art will appreciate that the invention is applicable to any system that includes an FDMA component (i.e., multiple carriers). Furthermore, the present invention can be implemented in systems including direct-sequence code division multiple access (DS-CDMA), frequency hopping, orthogonal frequency division multiplexing (OFDM), and other components.

Additionally, though the present invention has been described with respect to a maximum likelihood sequence estimation (MLSE) demodulation approach, other known demodulation approaches can be applied as well. For example, decision feedback equalization (DFE) or linear equalization (LE) can be utilized.

Furthermore, other methods of channel estimation can be used to provide the channel parameter estimates DSCP-B1, ASCP-B1, DSCP-B2, ASCP-B2 which are employed in the above described demodulation systems. See, for example, U.S. patent application Ser. No. 08/901,693, filed on even date herewith and entitled "Methods and Apparatus for Canceling Adjacent Channel Signals in Digital Communications Systems", which is incorporated herein in its entirety by reference.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

What is claimed is:

1. A method of channel estimation, comprising the steps of:
   receiving at least two baseband sample streams, each baseband sample stream corresponding to a different frequency band; and
   jointly estimating, in dependence upon said at least two baseband sample streams, channel coefficients for each of at least two information signals, wherein each of said transmitted information signals is transmitted in a different frequency band to compensate for effects resulting from frequency band spacing, and wherein channel coefficients for one of said information signals are estimated based on at least two of said baseband sample streams.

2. A joint channel estimator for use in a radio communications system wherein first and second information signals are transmitted in first and second frequency bands, respectively, to a receiver including receive filtering, said joint channel estimator comprising:
   a first input node for receiving a first baseband signal corresponding to the first frequency band;
   a second input node for receiving a second baseband signal corresponding to the second frequency band;
   a parameter processor providing estimates of filtering effects resulting from transmit filters and/or receive filters;
   a joint estimator for computing, in dependence upon the first and second baseband signals and the filtering effects estimates, medium responses corresponding to transmission paths for the first and second information signals; and
   a coupler for computing, in dependence upon the medium responses, channel estimates for each of the first and second information signals as received in each of the first and second frequency bands.

3. In a receiver, a baseband processor for jointly demodulating a set of information signals, each information signal being transmitted via a separate one of a plurality of carrier frequencies, said baseband processor comprising:
   a receiving unit for receiving a plurality of baseband sample sequences, each baseband sample sequence corresponding to one of the plurality of carrier frequencies;
   a symbol generator for generating hypothesized symbols corresponding to all of the information signals in the set;
   a joint metric processor for computing, in dependence upon the plurality of baseband sample sequences, joint metrics corresponding to the hypothesized symbols; and
   a joint sequence estimation processor for jointly estimating the information signals in dependence upon the joint metrics.

4. A baseband processor according to claim 3, wherein the joint metrics are formed by generating estimates of the received baseband sample sequences and computing magnitude-squared-differences between the estimates and the actual received baseband sample sequences.

5. A baseband processor according to claim 3, wherein the joint metrics are formed by generating transmission channel estimates and filtering the received baseband sample sequences using the transmission channel estimates.

6. A receiver for demodulating a set of information signals, each information signal corresponding to a separate one of a plurality of carrier frequencies, comprising:
   at least one antenna element for receiving a radio signal and providing a corresponding antenna signal;
   a radio processor coupled to said at least one antenna element for processing said antenna signal to provide a plurality of baseband sample streams, each baseband sample stream corresponding to one of the plurality of carrier frequencies; and
   a baseband processor coupled to said radio processor for processing the plurality of baseband sample streams to detect the information signals,
   wherein said baseband processor hypothesizes symbols corresponding to all information signals in the set, forms joint metrics corresponding to the hypothesized symbols in dependence upon the plurality of baseband sample streams, and jointly estimates symbols of the information signals based on the joint metrics.

7. A receiver according to claim 6, wherein the joint metrics are formed by generating estimates of the received baseband sample sequences and computing magnitude-squared-differences between the estimates and the actual received baseband sample sequences.

8. A receiver according to claim 6, wherein the joint metrics are formed by generating transmission channel estimates and filtering the received baseband sample sequences using the transmission channel estimates.

9. A method of jointly demodulating a set of information signals, each information signal being transmitted via a separate one of a plurality of carrier frequencies, comprising the steps of:

receiving a plurality of baseband sample sequences, each baseband sample sequence corresponding to one of the plurality of carrier frequencies;

generating hypothesized symbols corresponding to all of the information signals in the set;

computing joint metrics corresponding to the hypothesized symbols in dependence upon the plurality of baseband sample sequences; and jointly estimating the information signals in dependence upon the joint metrics.

10. A method according to claim 9, wherein the metrics are formed by generating estimates of the received baseband sample sequences and computing magnitude-squared-differences between the estimates and the actual received baseband sample sequences.

11. A method according to claim 9, wherein the metrics are formed by generating transmission channel estimates and filtering the received baseband sample sequences using the transmission channel estimates.

12. In a receiver, a baseband processor for demodulating at least two information streams, each information stream corresponding to a different carrier frequency, said baseband processor comprising:

a receiver unit for receiving at least two baseband sample streams, each baseband sample stream corresponding to a different carrier frequency;

a joint multi-signal channel estimator for jointly estimating channel coefficients for the at least two information streams in dependence upon the baseband sample streams;

a metric computer for computing joint branch metrics in dependence upon the estimated channel coefficients and the baseband sample streams; and a sequence estimator for jointly estimating the at least two information streams in dependence upon the joint branch metrics.

13. A radio receiver, comprising:

at least one antenna element for receiving a radio signal and providing a corresponding antenna signal;

a radio processor coupled to said at least one antenna element for processing said antenna signal to provide at least two baseband sample streams, each baseband sample stream corresponding to a different carrier frequency;

a joint channel estimator for jointly estimating channel coefficients, based on the baseband sample streams, for each of at least two information signals, each information signal corresponding to a different carrier frequency; and a joint demodulator coupled to said radio processor and said joint channel estimator for detecting the at least two information signals in dependence upon the baseband sample streams and the channel coefficients.

14. A method for demodulating at least two information streams, each information stream corresponding to a different carrier frequency, comprising the steps of:

receiving at least two baseband sample streams, each baseband sample stream corresponding to a different carrier frequency;

jointly estimating channel coefficients for the at least two information streams in dependence upon the baseband sample streams;

computing joint branch metrics in dependence upon the estimated channel coefficients and the baseband sample streams; and jointly estimating the at least two information streams in dependence upon the joint branch metrics.

15. In a receiver, a baseband processor for demodulating at least two information streams, each information stream corresponding to a different carrier frequency, said baseband processor comprising:

a receiver unit for receiving baseband samples corresponding to at least one carrier frequency;

a joint multi-signal channel estimator for jointly estimating channel coefficients for the at least two information streams in dependence upon the baseband samples, said joint channel estimator including a parameter processor for providing estimates of filtering effects resulting from transmit filters and/or receive filters;

a metric computer for computing joint branch metrics in dependence upon the estimated channel coefficients and the baseband samples; and a sequence estimator for jointly estimating the at least two information streams in dependence upon the joint branch metrics.

16. A radio receiver, comprising:

at least one antenna element for receiving a radio signal and providing a corresponding antenna signal;

a radio processor coupled to said at least one antenna element for processing said antenna signal to provide at least one baseband sample stream corresponding to a radio carrier frequency;

a joint channel estimator for jointly estimating medium responses, based on the at least one baseband sample stream, for each of at least two information signals, each information signal corresponding to a different carrier frequency, and said joint channel estimator including a parameter processor for providing estimates of filtering effects resulting from transmit filters and/or receive filters; and a joint demodulator coupled to said radio processor and said joint channel estimator for detecting the at least two information signals in dependence upon the at least one baseband sample stream and the medium responses.

17. A method for demodulating at least two information streams, each information stream corresponding to a different carrier frequency, comprising the steps of:

receiving baseband samples corresponding to at least one carrier frequency;

jointly estimating channel coefficients for the at least two information streams in dependence upon the baseband samples and including estimates of filtering effects resulting from transmit filters and/or receive filters;

computing joint branch metrics in dependence upon the estimated channel coefficients and the baseband samples; and jointly estimating the at least two information streams in dependence upon the joint branch metrics.

* * * * *